United States Patent

Bradbury

[15] 3,690,382
[45] Sept. 12, 1972

[54] APPARATUS FOR PULLING OUT ROW CROP PLANTS

[72] Inventor: Keith Douglas Bradbury, Juramento 3361, 7° "B", Buenos Aires, Argentina

[22] Filed: Dec. 8, 1970

[21] Appl. No.: 96,221

[30] Foreign Application Priority Data
Dec. 16, 1969 Brazil....................215,207

[52] U.S. Cl.................................171/56
[51] Int. Cl. ...............................A01d 25/04
[58] Field of Search..........171/56, 53; 56/327 R

[56] References Cited

UNITED STATES PATENTS

| | | | |
|---|---|---|---|
| 1,711,990 | 5/1929 | Coatsworth | 171/56 |
| 1,719,871 | 7/1929 | Burts | 171/56 |
| 1,787,026 | 12/1930 | Verhoff | 171/56 |

*Primary Examiner*—Antonio F. Guida
*Attorney*—Otto John Munz

[57] ABSTRACT

A self-lubricating harvester machine for harvesting row crops that is connected to and powered by a tractor includes a plurality of pairs of grasper-cutter devices that are arranged circumferentially in a protruding fashion from the peripheral of a wheel-like structure. Power-driven mechanisms are associated with the two formed wheel-like structures and operate the grasper-cutter devices that grasp, cut and pull the row crop as the devices contact the ground and that move to an open position upon leaving the ground to discharge the row crops.

1 Claim, 5 Drawing Figures

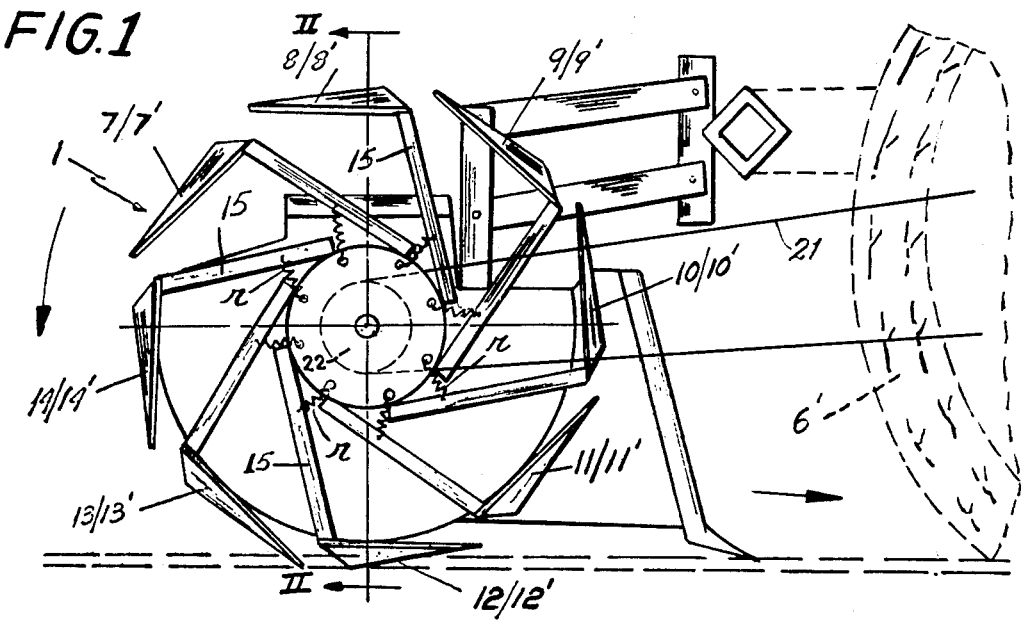
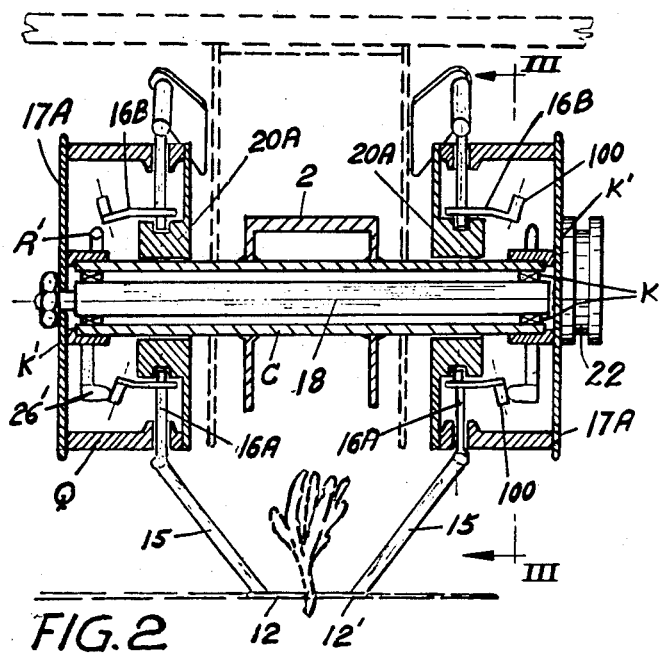

INVENTOR
KEITH DOUGLAS BRADBURY

BY
ATTORNEY

APPARATUS FOR PULLING OUT ROW CROP PLANTS

FIELD OF THE INVENTION

The present invention relates generally to agricultural machines. More particularly, the invention relates to a harvester machine for harvesting row crops, such as beans, chicken peas, soybeans, peas and lentils.

It is a known fact that in the harvesting of the product of such row crops that are close to the ground, the moving or cutting operation leads to great losses due to the destruction caused by the action of the row-scythe blade. On the other hand, if the row crop products are removed by hand, the pull operation will obviously avoid the use of the scythe, but will greatly increase the labor cost. Also another problem encountered with harvesting row crops, is the presence of weeds between the rows.

SUMMARY OF THE INVENTION

The improvement according to the present invention lies in providing a self-lubricating harvester machine which travels along the rows of crops to be harvested and which grasps, cuts and pulls the products from the rows and then releases the products therefrom. Other aspects of the invention are concerned with various improved components of the overall harvesting machine, including the wheel-like structures which perform the grasping, pulling and depositing actions. The power to operate the harvester machine is simply taken from the power take off of the tractor which moves the machine. Thus, the present harvester machine by taking only the power to operate the wheel-like structures is independent of the condition of the soil.

Other aspects of the present invention reside in the combination of elements, arrangement of parts, and features of construction, all of which will be more fully pointed out hereinafter and disclosed in the accompanying drawings wherein there is shown a preferred embodiment of this inventive concept.

BRIEF DESCRIPTION OF THE DRAWINGS

FIG. 1 is a side view of the harvester machine according to the present invention;

FIG. 2 is a section taken on line II—II in FIG. 1;

Similar reference characters refer to similar parts throughout the several views of the drawings.

DESCRIPTION OF THE PREFERRED EMBODIMENT

Figure 4:
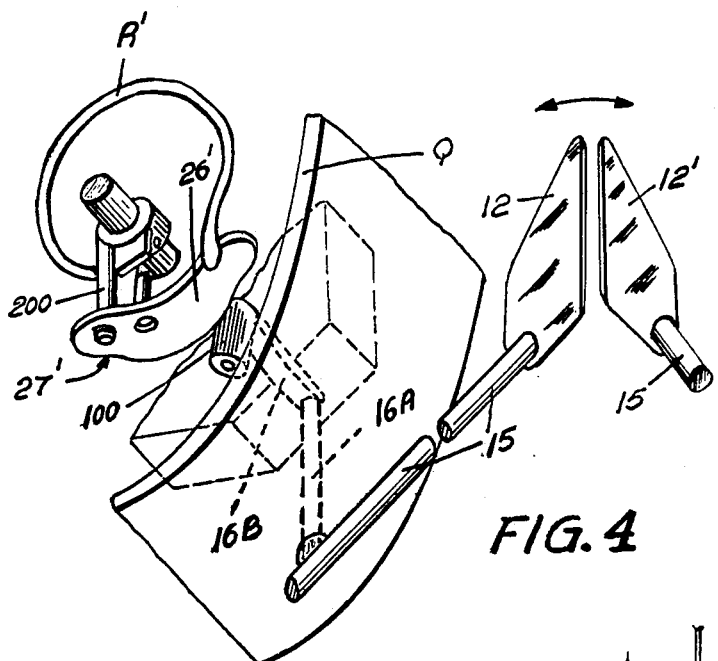
FIG. 4 is a detail of the cam and its spring embodied in the harvester machine.
Figure 5:
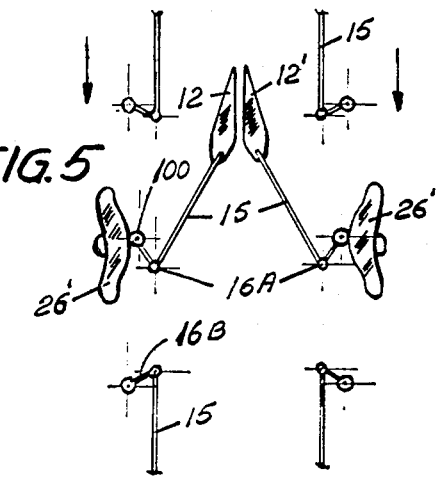
FIG. 5 is a schematic view of FIG. 2.
Figure 3:
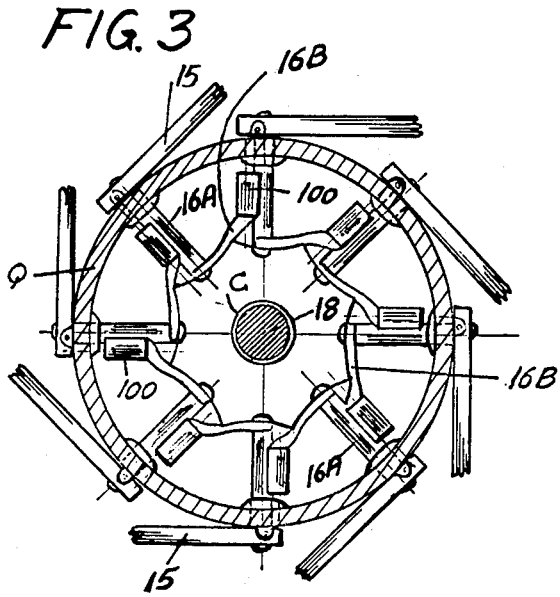
FIG. 3 is a fragmentary section taken on line III—III in FIG. 2.

Having reference now to the drawings in detail, there is generally indicated at 1 a self-lubricating harvester machine constructed in accordance with the instant invention, which machine is adapted to be drawn by and power-connected to a tractor 6' which is of conventional construction so far as the present invention is concerned. Examples of prior art power-connected type implements are disclosed in U.S. Pat. No. 1,257,192 to Crawford et al., issue date of Feb. 19, 1918 and 2,540,094 to Brown et al., issue date of Feb. 6, 1951.

The harvester machine 1 includes a shaft 18 that is rotatably mounted in bearings K and thrust bearings K' at its respective ends (see FIG. 2). The bearings KK' are mounted in a sleeve member C that is coaxial to the entire length of the shaft 18. Thus, the shaft 18 is rotatably mounted within sleeve member C by means of bearings K, K'. Further, a frame 2 is integrally secured to a portion of the sleeve member C by welding as illustrated in FIG. 2.

An important aspect of the invention is the unique construction and arrangement of the pairs of power-operated grasper-cutter blade devices that are supported by a pair of drum housings Q that are secured respectively on the opposite ends of the shaft 18. The drum housings Q are in turn mounted on the sleeve member C and are rotatably supported thereon by bracket sleeves 20 A. Thus, there is arranged, between the ends of the sleeve member C and disks 17A, the thrust bearings K' which, together with bearings K are positioned between the sleeve member C and the shaft 18. Consequently, free rotation of the shaft 18 and drum housings Q is permitted by the drive from a pulley wheel 22. The respective pairs of grasper-cutter blade devices are identified in the drawings by reference numbers, 7/7', 8/8', 9/9', 10/10', 11/11', 12/12', 13/13' and 14/14'.

To form a substantially enclosed housing, a disk 17 A is constructed as an outer wall member for each of the drum housings Q.

Each drum housing Q includes a power mechanism for operating the grasper-cutter devices. Each of the housings Q has the bracket sleeve 20A for rotary support thereof, coaxially mounted on sleeve member C. The bracket sleeve 20A has embedded therein one end of a rod 16A that extends in a direction outwardly from the axis of the shaft 18. A shank 16 B is perpendicularly mounted and integrally fixed to rod 16A and carries a roller 100 at its outer end. The roller 100 operatively engages a flatbar 26' that has a curved or arched configuration to form a cam profile 27' as illustrated in FIG. 4. One end of a bolt 200 is pivotally connected to flatbar 26' and the other end is rigidly connected directly or indirectly to sleeve member C. Spiraloid spring R' serves as a supplemental support to the bolt 200 and the structures that depend therefrom.

The other end of the depending rod 16A has an arm 15 integrally mounted thereon at an obtuse angle whereby the respective arm 15 of each drum housing Q slants toward one another as shown in FIG. 2. Each arm 15 carries one of the grasper-cutter devices 7/7'–1 4/14' in a plane parallel to the ground and the respective facing pairs of grasper-cutter devices cooperate to form the means for severing a crop plant. Normally in operation, the respective facing pairs of the grasper-cutter devices tend to remain open. That is, each grasper-cutter device separates from the opposing one due to the biasing action of spring r (see FIG. 1.).

The power for the operation of the harvester machine 1, as noted above, is provided by tractor 6'. . As the tractor 6' moves, a drive belt 21 having one end connected to the tractor 6' rotates a pulley wheel 22 that is axially mounted at one end of shaft 18 as shown in FIGS. 1 and 2. The pulley wheel 22 is integrally secured to the disk 17A of the right-handed drum housing Q (see FIG. 2) Consequently, the shaft 18 is rotated by the integrally mounted structural arrangement of the respective drum housing Q through the pulley wheel 22.

Therefore, as the pulley wheel 22 rotates, the contiguous disk 17A also rotates, and through the respective power mechanisms, the respective pairs of facing grasper-cutter devices travel in a counter-wise movement around the axis of shaft 18 to perform the harvester operations of grasping, cutting and pulling crop plants as the grasper-cutter devices contact the ground.

As the grasper-cutter devices move in their rotary planes, the respective roller 100 (see FIGS. 2 and 4) contacts cam profile 27' and thereby the grasper-cutter device arrive at their operative harvest position.

Consequently, if a stone or an equivalent obstacle has not remained lodged between respective facing grasper-cutter devices, the spiraloid spring R' will remain inoperative. The resistance of spring R' is greater than that of spring r (see FIG. 1). Therefore, rod 16A being biased by shank 16 B, causes the rotation of the arm 15. Consequently, the respective blade of the grasper-cutter device rotates and due to equal and symmetrical causes, the rotation likewise of the opposing blade. This cutting action of the respective blades severs a crop plant.

It is to be noted that when a stone or obstacle lodges between respective facing blades, spring R' will yield. In such a situation, since bar 26' is pivoted on bolt 200, the movement of cam bar 26' would not be sudden, but would instead, be a gradual movement. The bar 26' pivots or turns about on bolt 200 in such a manner, that as soon as the obstacle disappears, spring R' returns to its original position and causes the closure of the respective pair of blades.

Each drum housing Q is filled with a charge of lubricant and as will be apparent in view of the foregoing, the lubricant provides a self-lubrication to the harvester elements of the respective power mechanism.

While specific structural details have been shown and described, it should be understood that changes and alterations may be resorted to without departing from the spirit of the invention as defined in the appended claim.

What I claim is:

1. A self-lubricating harvester machine for harvesting row crops close to the ground and for being power connected to a tractor comprising in combination:
   a frame;
   a shaft adapted to be power driven by said tractor;
   a sleeve member coaxially mounted on said shaft and fixedly mounted on said frame;
   said shaft rotatably mounted within said sleeve member;
   a pair of drum housings, each connected in a freely rotatable manner on end portions of said sleeve member, said drum housings being joined, respectively, in an integral manner to the ends of said shaft;
   drive mechanisms operatively associated with said drum housings;
   a plurality of cams; each engaging one of said drive mechanisms for actuation thereof;
   a plurality of elements operatively connected with said drive mechanisms and said cams and being angularly displaceable thereby;
   a traction spring mounted on said frame for biasing said elements;
   a plurality of pairs of grasper-cutter devices operatively connected to said elements and circumferentially spaced beyond the peripherals of said drum housings;
   said devices mounted equidistant from one another and forming wheel-like structures;
   said wheel-like structures grasp, cut and pull the row crops as the said devices contact the ground and discharge the row crops upon leaving the ground;
   said drum housing adapted to contain charges of lubricant for lubricating the harvester combination.

* * * * *